Dec. 26, 1933.　　M. C. LARSON ET AL　　1,940,756
BEARING
Filed April 7, 1932　　2 Sheets-Sheet 1

Inventor
Magnus C. Larson
John J. Volansky
By Clarence A. O'Brien
Attorney

Dec. 26, 1933. M. C. LARSON ET AL 1,940,756
BEARING
Filed April 7, 1932 2 Sheets-Sheet 2

Inventor
Magnus C. Larson
John J. Volansky
By Clarence A. O'Brien
Attorney

Patented Dec. 26, 1933

1,940,756

UNITED STATES PATENT OFFICE 1,940,756

BEARING

Magnus C. Larson and John J. Volansky,
Pottsville, Pa.

Application April 7, 1932. Serial No. 603,878

1 Claim. (Cl. 308—211)

This invention relates to bearings and is an improvement over the type of bearing forming the subject matter of Patent No. 1,845,425 granted to Magnus C. Larson et al., February 16, 1932.

The present invention together with its numerous objects and advantages will be best understood from the following description, taken in connection with the accompanying drawings wherein.

Figure 1:
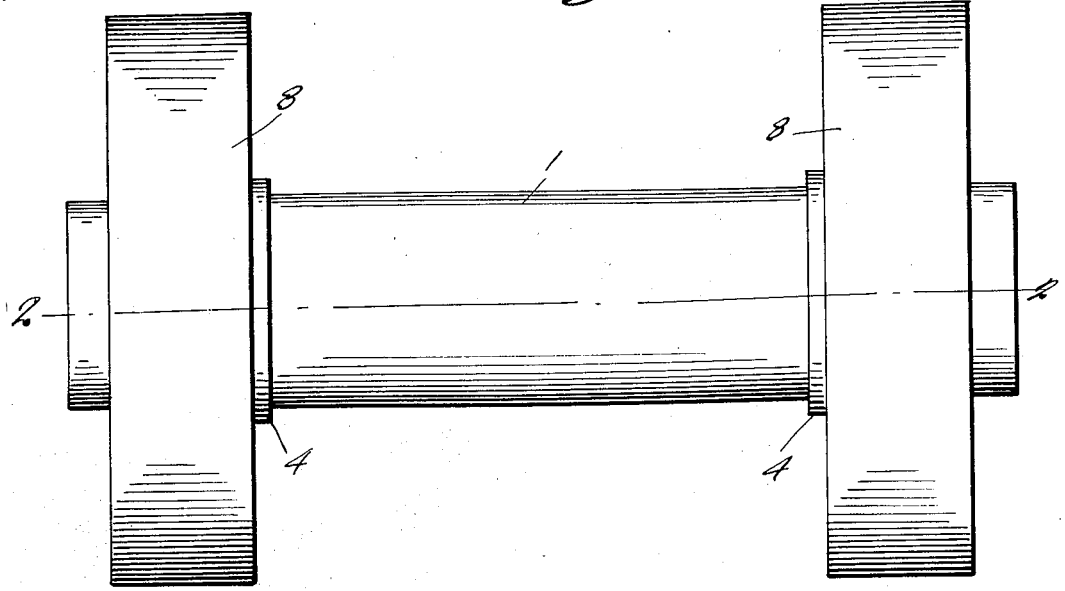
Figure 1 is a plan view of the bearing.

Referring more in detail to the drawings it will be seen that 1 indicates a sleeve through which in spaced relation extends a shaft 2 that projects at its ends beyond the corresponding ends of the sleeve 1, and is provided at said ends with threads 3. The sleeve 1 at each end thereof is provided with a grooved collar 4.

At each end of the sleeve 1 there is provided a disk 5 that has its inner circular edge engaging in the circumferential groove of the proximate collar 4 at the end of sleeve 1, and the disks 5 are provided with conical inner faces. A disk 6, also having a conical inner face is threaded for adjustment on each end of shaft 2, and suitable means such as a locking pin 7 may be provided for securing the disk 6 at the desired adjustment.

Figure 2:
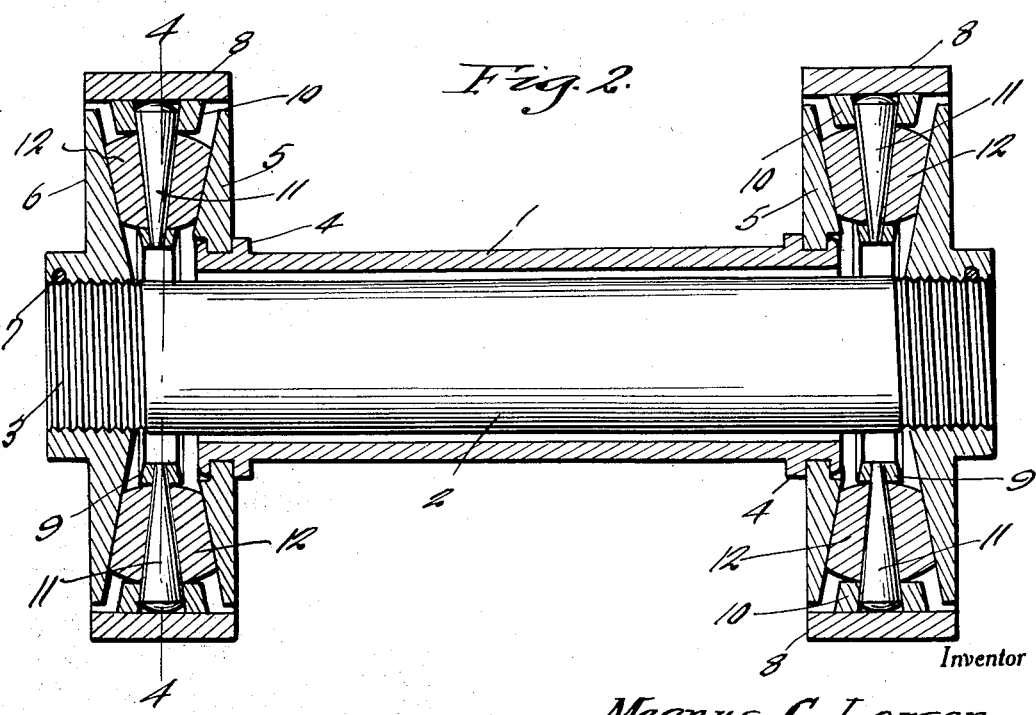
Figure 2 is a sectional elevational view therethrough taken substantially on the line 2—2 of Figure 1.
Figure 3:
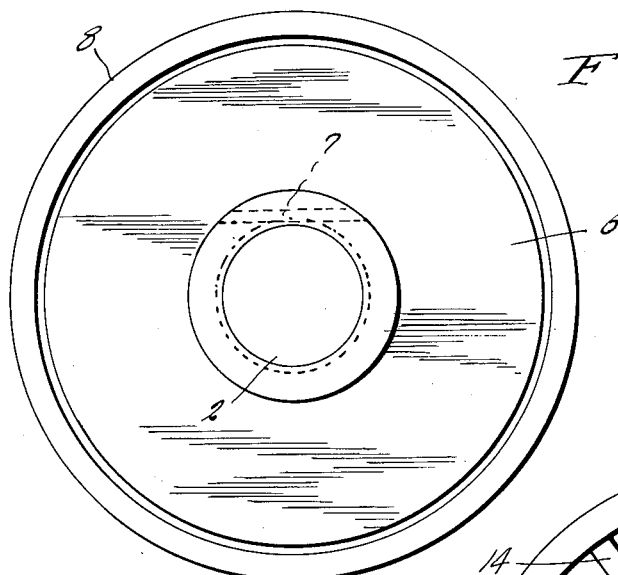
Figure 3 is an end elevational view of the bearing.
Figure 5:
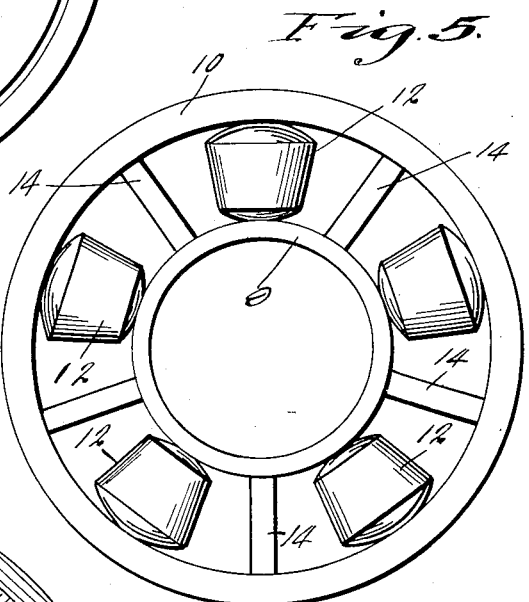
Figure 5 is a plan view showing tapered rollers mounted between inner and outer rings.
Figure 4:
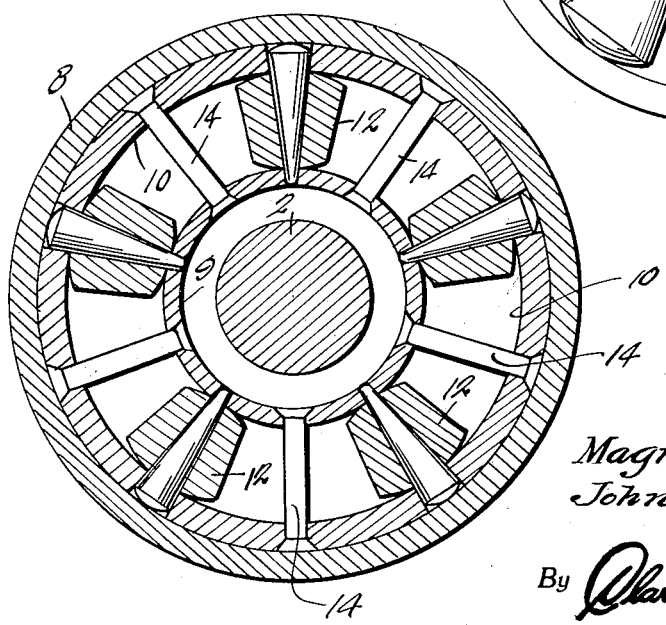
Figure 4 is a sectional elevational view taken substantially on the line 4—4 of Figure 2.

Disposed between the outer marginal edges of a disk 5 and a proximate disk 6 is a stationary annular casing 8, the same being of slightly greater diameter than the diameters of the disks 5 and 6 as shown in Figure 2.

Fixed within the annulus 8 between the disks 5 and 6 are inner and outer rings 9 and 10 respectively, the inner ring 9 being of less width than the outer ring 10 and extending concentrically to and spaced from the shaft 2.

The rings 9 and 10 have their edges beveled as shown. The outer ring 10 is fixedly secured to the inner periphery of the annulus 8 by sweating or in any other suitable manner; and the rings 9 and 10 are provided with radially alined tapered openings in which the end portions of tapered pins 11 are journalled, the outer portions of said pin being rounded and bearing against the inner periphery of the annulus 8. Tapered rollers 12 are mounted on the pins 11 between the inner and outer rings 9, 10 and have rolling contact with the conical inner faces of the opposed disks 5 and 6.

The inner and outer rings 9 and 10 are rigidly secured together through the medium of grooves 14 which are disposed radially between the tapered rollers 12, and the rivets or bolts 14 have at the ends thereof tapered heads countersunk in the rings 9 and 10.

In actual practice the disks 5 are made fast to the sleeve 1 in any suitable manner, and it will be apparent that to compensate for wear the keys 7 may be removed, and disks 6 threaded axially inwardly of the shaft 2.

To use the bearing as a wheel support vehicle the bearings can be rigidly secured to the under frame of the vehicle either by suitably and fixedly mounting the sleeve 1 on said frame or by increasing the length of shaft 2 and suitably mounting the ends thereof on the vehicle frame, the annular casing 8 including as rims, and the parts associated therewith serving as the other necessary parts of the wheel.

Even though we have shown and described the preferred embodiment of our invention, it is to be understood that we do not wish to limit ourselves to the precise details of construction, combination and arrangement of elements as herein shown, but claim all such forms of the invention to which we are entitled in view of the requirements of the prior art and scope of the appended claim.

Having thus described our invention, what we claim as new is:

Means for the purpose described comprising in combination a sleeve, disks carried at the ends of the sleeve and having outer conical faces, a shaft arranged in and spaced from the sleeve and extending throughout the length of the sleeve and beyond the ends thereof and having threaded end portions, threaded disks mounted on said threaded end portions of the shaft and having inner conical faces, annular members surrounding and spaced from the perimeters of the sleeve and shaft disks and having apertured rings at their inner sides, inner apertured rings interposed between and spaced from the shaft disks and the ends of the sleeve, means extending between and fixedly connected to the outer and inner rings, said means being in the form of bolts spaced apart, inwardly tapered pins journaled in the apertures of the outer and inner rings, and inwardly tapered radially disposed rollers mounted on said tapered pins and interposed between and contacting with the conical faces of the opposed sleeve and shaft disks.

MAGNUS C. LARSON.
JOHN J. VOLANSKY.